US 6,550,183 B2

(12) United States Patent
Nakashima (10) Patent No.: US 6,550,183 B2
(45) Date of Patent: Apr. 22, 2003

(54) AGRI- AND HORTICULTURAL MATERIAL

(75) Inventor: Todomu Nakashima, Kumamoto-ken (JP)

(73) Assignee: Limited Company Nogyokagaku Kenkyusho, Kumamoto (JP)

( * ) Notice: Subject to any disclaimer, the term of this patent is extended or adjusted under 35 U.S.C. 154(b) by 0 days.

(21) Appl. No.: 09/934,557

(22) Filed: Aug. 23, 2001

(65) Prior Publication Data

US 2002/0043019 A1 Apr. 18, 2002

(30) Foreign Application Priority Data

Aug. 25, 2000 (JP) ........................................ 2000-255918
Jun. 25, 2001 (JP) ........................................ 2001-191955

(51) Int. Cl.[7] .............................................. C05D 11/00
(52) U.S. Cl. ...................................... 47/58.15 C; 71/31
(58) Field of Search ....................... 47/1.01 R, 58.15 C, 47/58.1 R, 9; 71/31

(56) References Cited

U.S. PATENT DOCUMENTS

| 3,071,457 A | * | 1/1963 | Murray ........................ 71/31 X |
| 4,015,971 A | * | 4/1977 | Barannik et al. ........... 210/721 |
| 4,634,533 A | * | 1/1987 | Somerville et al. ......... 210/722 |
| 5,074,901 A | * | 12/1991 | Alderman ....................... 71/65 |
| 2002/0043019 A1 | * | 4/2002 | Nakashima .............. 47/1.01 R |

FOREIGN PATENT DOCUMENTS

| EP | 1153901 A2 | * | 11/2001 |
| WO | WO 93/07753 | * | 4/1993 |

OTHER PUBLICATIONS

Todomu, N. et al. 1998. Study of the relation between trace elements and the contents of them in brown rice. Biomed. Res. Trace Elem. 9(3): 255–256.*

* cited by examiner

Primary Examiner—Peter M. Poon
Assistant Examiner—Jeffrey L. Gellner
(74) Attorney, Agent, or Firm—Birch, Stewart, Kolasch & Birch, LLP (57) ABSTRACT

The present invention relates to an agri- and horticultural material having bittern as an active ingredient containing Se at a level of 1.0 to 5.0 ppm, preferably 1.5 to 4.0 ppm, and the same to V if V is also necessary, and by application of Se (and V), the balance among minerals is improved to make plants healthy, resulting in effects of improving qualities of crops, such as control of harmful insects and ticks, preventing diseases, promotion of growth, increase of sugar levels in fruits, and enhancement of taste and good body without using agrichemicals or fertilizers.

16 Claims, 6 Drawing Sheets

SUITABLE RANGE OF NUTRIENTS IN A FORM CAPABLE OF BEING SUPPLIED TO CULTIVATED SOIL (PER 100g SOIL)

| | pH | A-N | N-N | P | K | Ca | Mg | Mn | Fe | Cu | Zn | B |
|---|---|---|---|---|---|---|---|---|---|---|---|---|
| EXCESSIVE RANGE ← | -6.5- | | | | | | | | | | | |
| SUITABLE RANGE | | -1.5- mg | -3.5- mg | -60- mg | -40- mg | -400- mg | -70- ppm | -20- ppm | -100- ppm | -3.5- ppm | -40- ppm | -2.5- ppm |
| INSUFFICIENT RANGE → | -5.5- | -0.3- mg | -0.7- mg | -20- mg | -15- mg | -200- mg | -35- ppm | -7- ppm | -15- ppm | -1.0- ppm | -10- ppm | -0.7- ppm |

AGRI- AND HORTICULTURAL MATERIAL

DETAILED DESCRIPTION OF THE INVENTION

1. Technical Field of the Invention

The present invention relates to an agri- and horticultural material and in particular to a novel agri- and horticultural material of completely different type from conventional agrichemicals and fertilizers and also capable of improving qualities of crops, which comprises selenium and if necessary vanadium.

2. Background of the Invention

In modern agri- and horticulture, insecticides, bactericides, weed-killers and other agrichemicals must be used frequently under the present circumstances for the purpose of labor saving, higher yield etc., but from the viewpoint of pollution of crops and domestic animals, environmental pollution, residual toxicity and hazard during handling, development of safer agrichemicals and less-polluting agrichemicals is strongly desired for agrichemicals. However, because agrichemicals are originally those for preventing harmful organisms, it is inevitable under the present circumstances to use highly toxic agrochemicals.

The foregoing also applies to fertilizers, and for the purpose of soil improvement, higher yield etc., various chemical fertilizers are used frequently, but a reduction in soil productivity is inevitable, resulting often in fruit-bearing in alternate years or in failure in repeated cultivation on the same ground under the present circumstances.

On the other hand, as the social situation on foods is changing, there is an increasing demand not only for higher productivity and yield of crops and foods but also for safety of crops and improvements in the qualities thereof, and in such improvements in the qualities of crops, there is also an increasing demand not only for an increase in sugar level in fruits etc. but also for taste and good body, that is, there is also an increasing demand for fruits and various vegetables having not only simple sweetness but also taste and good body, so there is an increasing demand for further improvements in the qualities.

Due to a reconsideration of frequent use of chemical fertilizers and agrichemicals, organic farming and organic cultivation using compost etc. came to be conducted in recent years, but these are conducted mainly for the purpose of safe cultivation using no or less chemicals, and for this difference in the purpose etc., these methods can hardly achieve improvements in the qualities of crops, let alone enhancement of taste and good body, and it has been desired to develop a superior system which can be substituted for these methods.

PROBLEM TO BE SOLVED BY THE INVENTION

The present invention was made in view of the present circumstances described above, and the object of the present invention is to develop a novel agri- and horticultural material of completely different type from conventional agrichemicals and fertilizers and capable of keeping crop health, promoting growth to increase yield, and improving qualities of crops.

MEANS TO SOLVE THE PROBLEM

Figure 1:
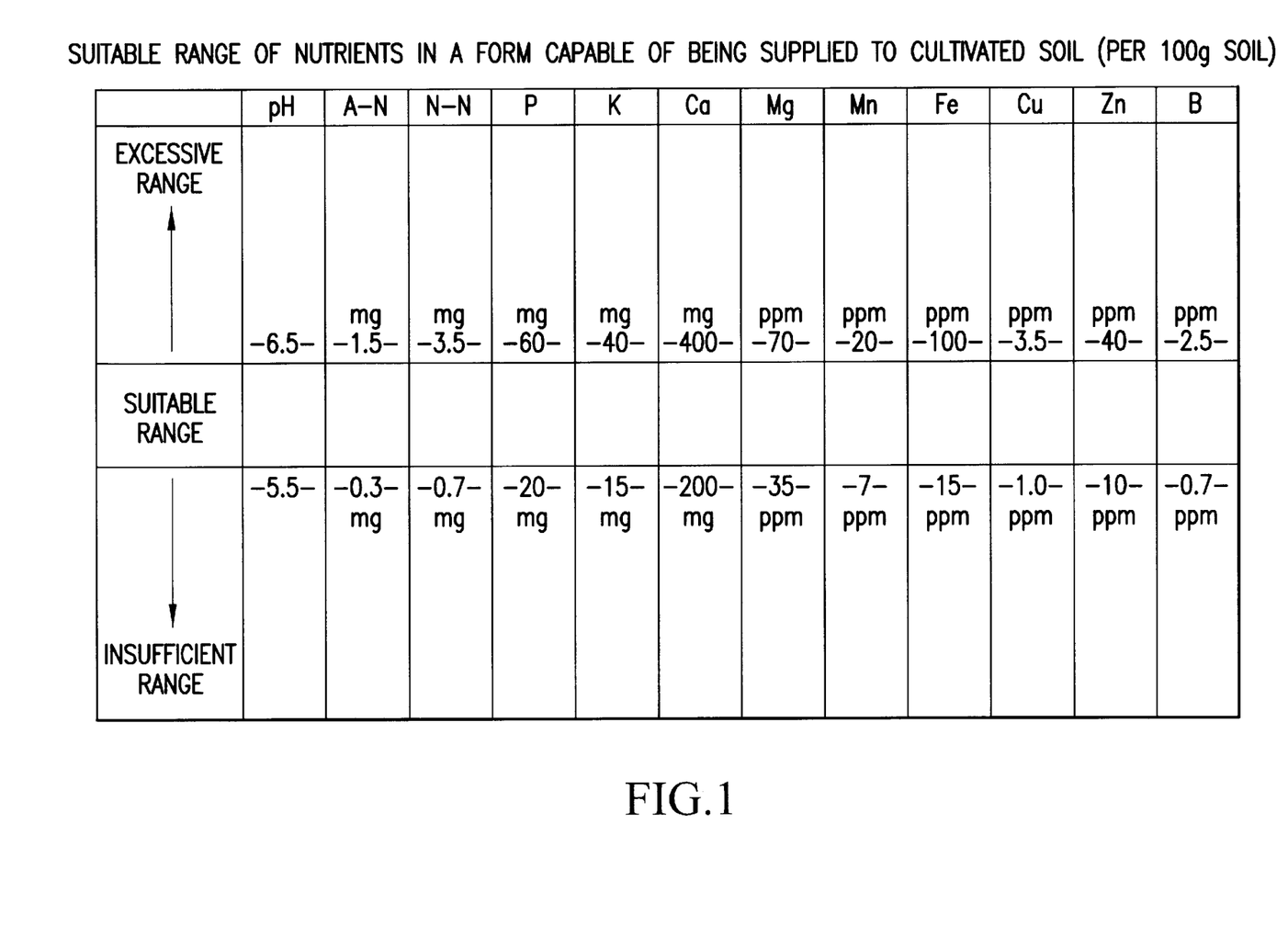
FIG. 1 shows a suitable range of nutrients in a form capable of being supplied to cultivated soil.

As a result of extensive investigation for achieving the object described above, the present inventors first focused their attention on less generation of damage from disease and harmful insects in fields where higher yield is maintained with high productivity or in lands where plants grow healthy. As a result of extensive analysis and investigation of soil in these lands, the present inventors found that in addition to abundant essential elements (nitrogen, phosphate, potassium), specific trace elements (also referred to as inorganic components or minerals) and ultra-trace elements are necessary, and they determined not only the types of such elements but also the necessary amounts thereof, thus arriving at the new epoch-making finding that a certain balance among trace elements (also referred to as mineral balance) is necessary (FIG. 1).

On the other hand, the present inventors also found that if crops are poor in nutrients and their health is damaged, the crops are liable to damage from disease and harmful insects, and also that the mineral balance in the soil has collapsed in such a case. Further, the present inventors had the analysis result that in Japan, abundant essential elements are generally in excess, whereas trace elements are too little to maintain the balance.

From these findings, the present inventors arrived at the new idea that by cultivating crops healthfully, generation of damage from disease and harmful insects can be suppressed and application of agrichemicals can be controlled, and the mineral balance is necessary therefor. For put this idea into practice, the inventors applied trace elements in larger amounts, but application of some trace elements in larger amounts caused chemical damage to crops, thus failing to achieve complete success.

Therefore, by looking it from a complete different angle, the present inventors focused their attention to selenium (also called Se) unregarded heretofore as a component or a trace component in fertilizers and estimated to cause hazards such as chemical damage to plants, and they unexpectedly found that when a saline solution containing selenium was supplied to roots of a strawberry plant, absorption of nutrients such as minerals was promoted to increase a rooting action, and there was abnormal generation of root hairs particularly having an ability to selectively absorb nutrients and hardly observed without at least 200 magnification under a microscope. Further, the inventors arrived for the first time at the new and very useful finding that by supplying the saline solution, rust ticks previously present on leaves of the strawberry plant could be controlled, and the strawberry plant could recover thus generating healthy new leaves and permitting harvest of fruits. Further, the inventors also arrived for the first time at the useful finding that vanadium (also called V) has a similar action, so that the combined use of V and Se can bring about a further excellent working effect.

The present invention was completed at last as a result of further extensive study on the basis of these useful and new findings, and the basic technical idea of the present invention lies in an agri- and horticultural material comprising selenium and if necessary vanadium as the active ingredient, and non-limiting embodiments of the present invention are as follows:

(1) An agri- and horticultural material comprising bittern as an active ingredient containing selenium at a level of 1.0 to 5.0 ppm, preferably 1.5 to 4.0 ppm.

(2) An agri- and horticultural material comprising bittern as an active ingredient containing selenium and vanadium respectively at a level of 1.0 to 5.0 ppm, preferably 1.5 to 4.0 ppm.

To achieve the intended object, high-selenium bittern containing selenium at a level of 1.0 to 5.0 ppm, preferably 1.5 to 4.0 ppm, is used as the selenium-containing bittern used as the active ingredient of the present invention. The bittern is a byproduct in salt manufacturing, which is a liquid from which common salt was crystallized in producing common salt from seawater, so the composition thereof varies inevitably depending on the place where it was produced, but for the purpose of the present invention, high-selenium bittern shall be selected.

The present inventors attracted attention to mineral-containing seawater, and found as a result of study that seawater near the mouth of a river flowing through granitic or basaltic regions contains much selenium, and such seawater can be used after concentrated by e.g. heating or ultrafiltration, and also that that bittern remaining after production of common salt from such seawater can be used directly as the high-selenium bittern. As a matter of course, such bittern can further be concentrated to increase the selenium concentration. This also applies to vanadium.

As the high-selenium bittern, bittern produced by, e.g., Fujian Salt Products Import and Export Corporation in People's Republic in China, can be mentioned as one preferable example of the high-selenium and high-vanadium bittern of the present invention because of a high vanadium content and good balance among other minerals, but use can also be made of bittern produced from high-selenium (an high-vanadium) seawater collected from the above-described regions.

As described above, vanadium-containing high-selenium bittern is used in the present invention, and high-selenium and high-vanadium bittern is more preferable, and if desired, either high-selenium or high-vanadium bittern may be blended to produce the desired bittern. Further, bittern may be suitably treated in a usual manner to separate the desired components to provide the desired bittern, or the separated components are blended with other bittern to provide the desired bittern.

In the present invention, it is also possible to use not only bittern but also any mineral compositions containing Se (and V as necessary) respectively at a level of 1.0 to 5.0 ppm, preferably 1.5 to 4.0 ppm; for example, any compositions containing selenium alone, selenium compounds (selenium dioxide, selenic acid, selenious acid or other inorganic or organic selenium compounds), selenium-containing minerals and any other selenium-containing materials can be used as the selenium-containing composition in any forms such as solid, semi-solid, liquid, suspension, emulsion etc. Further, any compositions containing vanadium alone, vanadium compounds (various vanadium oxides (II, III, IV, V), various vanadates (ortho-, meta-, pyro- or poly-vanadates) and other inorganic or organic vanadium compounds), vanadium-containing minerals, and any other vanadium materials may be used as the vanadium-containing composition in any forms such as solid, semi-solid, liquid, suspension, emulsion etc. as is the case with the selenium-containing composition.

If desired, the selenium-containing composition (and if necessary the vanadium-containing composition) described above is added to various kinds of bittern thereby adjusting the content of selenium (and vanadium) to the desired range, to provide the high-selenium (and high-vanadium) bittern as the desired active ingredient.

As described above, the agri- and horticultural material of the present invention comprises high-selenium (and if necessary high-vanadium) bittern or a wide variety of compositions containing selenium (and vanadium) as the active ingredient, and the agri- and horticultural material may be composed of the active ingredient exclusively or the active ingredient plus other components.

As the other components, use can be made of e.g. water, seawater, saline, bittern, hot-spring water, mineral-spring water, mineral water, various assistants used in manufacturing of agrichemicals, trace components for fertilizers, and as necessary a wide variety of fertilizers and agrichemicals themselves.

The agri- and horticultural material of the present invention may be prepared from the active ingredient for example by a conventional method of manufacturing agrichemicals, and for example, the active ingredient is compounded with carriers, a surfactant, a dispersant, an assistant or the like and formed in a usual manner preferably into powder, a hydrate, an emulsion, a flowable agent or granules. Preferably the carriers include e.g. solid carries such as clay, talc, bentonite, diatomaceous earth, white carbon, kaolin, vermiculite, slaked lime, siliceous sand, ammonium sulfate and urea, and the surfactant and the dispersant include e.g. metal alkyl benzene sulfonates, polyoxyethylene alkyl aryl ethers, sodium alkyl sulfates, sodium alkyl naphthalene sulfonates, sodium dinaphthyl methane disulfonate, sodium lignin sulfonate etc. The assistant includes e.g. carboxymethyl cellulose, polyethylene glycol, gum arabic, starch, lactose etc.

The agri- and horticultural material of the present invention is characterized in that it can be sprayed or applied not only onto soil but also onto stems and leaves. For example, the agri- and horticultural material can be not only applied directly to at least one member selected from the group consisting of stems, leaves, buds, flowers and fruits but also supplied to roots or soil. For application, this material is preferably diluted 100- to 3000-fold before use. The material is diluted depending on the case, but diluted generally about 400- to 1500-fold for protection from the plant damage caused by disease or about 100- to 500-fold for control of harmful insects. For the purpose of prevention, it may be further diluted.

The agri- and horticultural material of the present invention is characterized by having quality-improving actions on various crops, such as an action of controlling harmful insects and ticks, an action of preventing diseases, an action of promoting plant growth, an action for maintaining and improving mineral balance (homeostasis) in soil and crops, an action of increasing sugar levels in fruits and other crops and/or an action of enhancing taste and good body, and further the agri- and horticultural material is epoch-making in that unlike agrichemicals, it does not act directly on harmful insects and pathogenic microorganisms to kill them, but it achieves each of the actions indirectly by improving the mineral balance in crops to make them healthy. That is, the agri- and horticultural material of the present invention is characterized distinctly by being of completely different type from agrichemicals, fertilizers, plant growth regulators etc.

By applying the agri- and horticultural material of the present invention, absorption of minerals (e.g., zinc, manganese, iron, copper etc.) is promoted to improve mineral balance, and thus a plant becomes more healthy (which corresponds in an animal to an increase in immunity) by interactions such as promotion of rooting, promotion of photosynthesis etc., resulting not only in protection from damage caused by insects carrying disease germs but also in achievement of therapeutic effects and regeneration of cells, thus demonstration the actions of promoting formation of chlorophylls to make leave surfaces glossy, demonstrating growth promotion, maintaining and improving the mineral balance, and increasing sugar levels.

The detailed mechanism of the working effects achieved by the active ingredient remains to be revealed in study in the future, but it is tentatively estimated that absorption of various nutrients such as minerals via roots into crops is promoted, resulting in significant generation of rootlets, particularly hair roots, by which selective absorption of nutrients occurs vigorously to make crops healthy, thus achieving a wide variety of useful effects without using agrichemicals or fertilizers.

As will also be revealed from the following description, use of Se and V in the present invention brings about significant promotion of absorption of minerals (particularly zinc, copper, manganese, iron etc.) (that is, induced absorption thereof to maintain the homeostasis of essential heavy metals) thereby also significantly influencing the formation of an amino acid serving as an active group in an enzyme involved in converting nitrogen into protein, and the present invention is characterized in that Se itself is absorbed in a very small amount. Accordingly, it is estimated that Se acts for facilitating absorption of various trace components present in soil, and Se allows the trace components in soil not utilized by crops to be effectively utilized by the crops. When the trace components are insufficient or absent, they may be added or allowed to be present, and for this purpose, e.g. a Se-containing mineral composition can be preferably used as the Se-containing composition in order to permit not only Se but also various minerals to be utilized simultaneously. Further, commercial cultivation of crops in soil polluted with harmful minerals such as mercury or cadmium is also promising according to the present invention because absorption of useful minerals is promoted while absorption of such harmful minerals is prevented. The detailed working effects of V remains to be revealed in study in the future, but it is estimated that one of the effects is to assist and amplify the above-described actions of Se.

The agri- and horticultural material of the present invention has a large number of excellent utilities described above and below, among which the action for improving qualities of crops is very distinctive.

That is, the agri- and horticultural material of the present invention has a specific action for improving at least one quality of sweetness, taste and good body for fruits and/or vegetables and a wide variety of other crops. That is, the significant effect of the present material is that not only crops with sweetness and crops with taste and good body, but also crops with very deep flavor having taste and good body can be obtained. Further, the present material is also characterized in that such significant effect is brought about for a desired period. That is, crops to be eaten just after harvest can achieve sweetness with good body just after harvest, while crops to be aged for a predetermined period before eating can achieve sweetness with good body after the predetermined period of aging.

As a result of further investigation of the quality-improving action, it was confirmed in the present invention that enhancement of sweetness is attributable to an increase in sugar levels as described later, while taste and good body are related to amino acids. Directing attention to this relationship to amino acids, amino acids were measured, and as a result it was confirmed that in amino acid compositions, some amino acids are decreased depending on crops, but there is a general tendency for amino acids to be increased.

As described above, the present inventors confirmed that by applying bittern directly to crops and/or soil, the proportion of amino acids in crops is increased (at least the amino acid composition is changed) to enhance taste and good body, and such finding is novel finding not known in the art. Using bittern, the present invention succeeded for the first time in improving qualities by increasing amino acids (and sugar levels) in crops to impart or enhance taste and good body (and sweetness).

The agri- and horticultural material of the present invention can be applied onto roots and supplied to soil, and alternatively it can also be sprayed onto stems and leaves and further applied onto stems, leaves, buds, flowers, fruits etc. For the purpose of the quality-improving action, it is preferable that the present material is not only applied to soil but also sprayed onto stems and leaves.

Hereinafter, the examples of the present invention are described in more detail.

EXAMPLE 1

As the selenium-containing mineral composition, naturally occurring high-selenium bittern from China was used, and as the agri- and horticultural material, said bittern was used as it was. The analysis results of components in said bittern are shown in Table 1, indicating that the bittern has a very high content of Se, and is rich not only in V but also in other mineral components.

TABLE 1

<Analysis values of mineral components>

| Item | Analysis value |
|---|---|
| pH | 7.70 |
| $NH_4$—N | 0.104 ppm |
| $NO_3$—N | 0.412 ppm |
| P | 10.397 ppm |
| K | 355449.970 ppm |
| Ca | 345.324 ppm |
| Mg | 36072.628 ppm |
| Mn | 1.417 ppm |
| Fe | 0.633 ppm |
| Cu | not detected |
| Zn | 0.062 ppm |
| B | 128.871 ppm |
| Na | 5.940 ppm |
| Al | 3.088 ppm |
| S | 15942.972 ppm |
| Ni | not detected |
| Cl | 151768.8 ppm |
| $SO_4$ | 47767.406 ppm |
| Cr | 0.047 ppm |
| Co | 0.043 ppm |
| Se | 3.500 ppm |
| Mo | 0.100 ppm |
| Sr | 24.692 ppm |
| Li | not detected |
| V | 3.100 ppm |

TABLE 1-continued

<Analysis values of mineral components>

| Item | Analysis value |
| --- | --- |
| As | 0.459 ppm |
| Cd | 0.017 ppm |
| I | 149.194 ppm |
| Hg | 0.820 ppm |
| Pb | 0.346 ppm |
| Si | 1.272 ppm |
| Te | 0.496 ppm |
| Au | 0.193 ppm |

EXAMPLE 2

Strawberry plants were treated with the agri- and horticultural material in Example 1, to give the following good test results.

Figure 2:
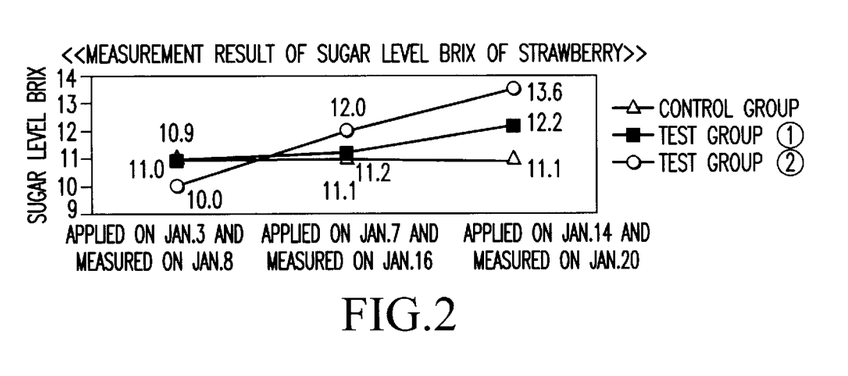
FIG. 2 shows the result of measurement of sugar levels in strawberry fruits.

(1) Strawberry plants (variety: Saga Honoka) were cultivated in a vinyl house (Shiraishi District, Saga Pref., JP). In a field of 3 ares, one are was used for the control group, one are for test group 1 and one are for test group 2, and the present material was applied onto each of the test groups on Jan. 3, Jan. 7 and Jan. 14, 2000, respectively, and the sugar levels in strawberry fruits in each group was analyzed on Jan. 8, Jan. 16 and Jan. 20. A 2000-fold dilute solution of the present material was supplied to roots in the test group 1, while a 1000-fold dilute solution of the present material was sprayed onto leaves in the test group 2. The results are shown in FIG. 2.

Figure 3:
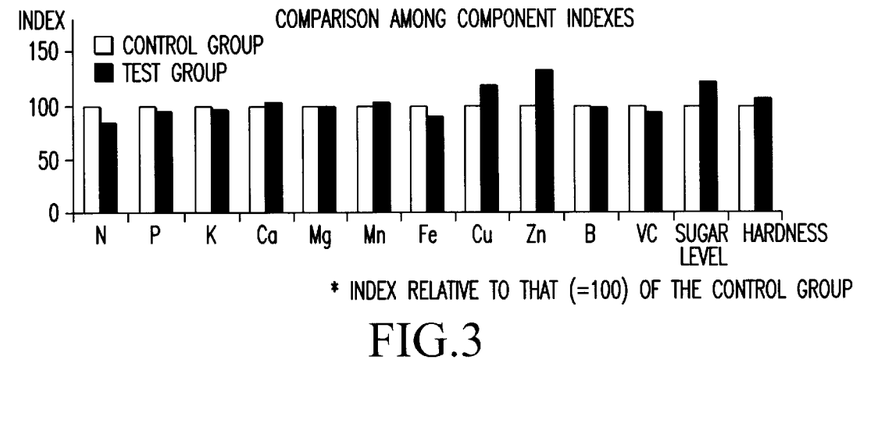
FIG. 3 is graph 1 for comparison among component indexes.

(2) The components in strawberry fruits obtained in the test group 2 were analyzed. The results are shown in Table 2 and FIG. 3.

TABLE 2

| | Component | Control group | Test group |
| --- | --- | --- | --- |
| N | (%) | 1.50 | 1.27 |
| P | (%) | 0.27 | 0.26 |
| K | (%) | 1.53 | 1.49 |
| Ca | (%) | 0.10 | 0.11 |
| Mg | (%) | 0.11 | 0.11 |
| Mn | (ppm) | 15.82 | 16.32 |
| Fe | (ppm) | 28.51 | 25.95 |
| Cu | (ppm) | 3.14 | 3.76 |
| Zn | (ppm) | 11.77 | 15.78 |
| B | (ppm) | 12.77 | 12.66 |
| Vitamin C | (mg/100 g) | (87.3) | (82.4) |
| Sugar level | Brix | (11.1) | (13.6) |
| Hardness | K | (0.40) | (0.43) |
| Water content | (%) | (88.7) | (88.9) |

*The value is expressed in a dry-weight basis, and the value in the brackets is expressed in a wet-weight basis.
*Sugar level: Ten fruits were homogenated by a mixer and measured 3 times with a digital Brix sugar-level meter to determine mean sugar level.
*Hardness: Ten fruits were measured 10 times for their hardness at a part with the maximum diameter in a horizontal direction by a fruit hardness meter (KM-1 model) to determine mean hardness.

(3) As can be seen form the above results, absorption of mineral components particularly Mn, Fe and Zn is promoted. Mn is effective for carbon dioxide assimilation through absorption of $CO_2$ through stomata, Fe along with Mn and Zn is effective as an active group in an oxidase in promoting photosynthesis, and Zn is a component essential not only for synthesis of DNA and RNA but also for cell division and growth, thus contributing to enlargement of fruits, higher yield thereof and growth of roots to promote absorption of nutrients.

Further, it was confirmed that by spraying the present material not only onto roots but also leaves in particular, both Zn and Fe are absorbed very well, the leaves are glossy and leaves are thick. This indicates an increase in the content of chlorophylls. Further, the fruits showed increases in sugar levels and in the contents of Zn, Cu and Mn, and by ingesting such strawberries, these trace elements involved in functioning of SOD (superoxide dismutase) can be taken without difficulty, to contribute to human health significantly.

(4) In a neighboring house, a large number of rust ticks were generated on strawberry leaves to terminate the growth of leaves and generate malformed fruits (Feb. 2, 2000). A large amount of agrichemicals were sprayed thereon, but the plants did not recover, and thus production should be abandoned. In this strawberry field, a 1500-fold dilute solution of the present agri- and horticultural material was supplied to roots, while a 600-fold dilute solution thereof was sprayed onto leaves, and at a result the plant recovered after one week, and fruits could be harvested.

(5) A different variety (variety: Toyonoka) of strawberry was tested. A 2000-fold dilute solution of the present material was supplied to roots of test group 1, while a 1000-fold dilute solution of the present material was sprayed onto leaves of test group 2. After the dilute solution was applied 4 times at 4-day intervals, the components in leaves of the strawberry plant were analyzed to give the results in Table 3 and FIG. 4.

TABLE 3

| Component | Control group | Test group (applied to roots) | Test group (applied to leaves) |
| --- | --- | --- | --- |
| N (%) | 3.56 | 3.27 | 3.87 |
| P (%) | 0.50 | 0.30 | 0.32 |
| K (%) | 1.54 | 1.42 | 1.56 |
| Ca (%) | 1.60 | 1.66 | 1.58 |
| Mg (%) | 0.56 | 0.53 | 0.46 |
| Mn (ppm) | 68.74 | 40.49 | 141.81 |
| Fe (ppm) | 171.54 | 227.87 | 257.13 |
| Cu (ppm) | 6.18 | 5.06 | 4.58 |
| Zn (ppm) | 24.28 | 70.53 | 34.23 |
| B (ppm) | 84.48 | 33.67 | 37.19 |
| Se (ppm) | 0.21 | 0.23 | 0.22 |
| Cr (ppm) | 1.65 | 0.51 | 0.43 |

* The value is shown on a dry-weight basis.
* Selenium was examined with a hydride generator.

Figure 4:
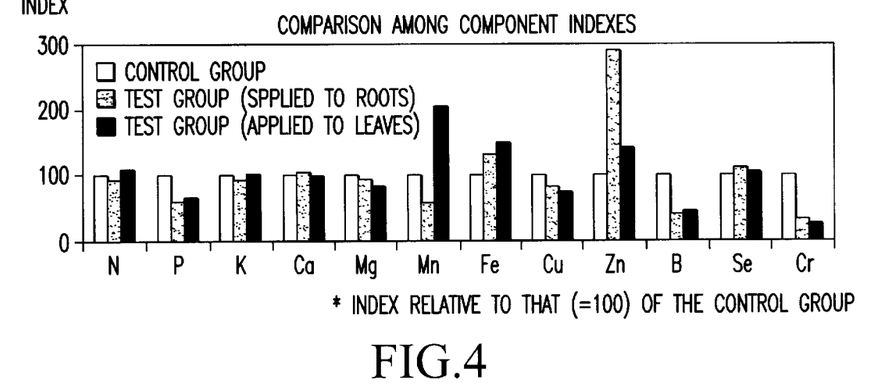
FIG. 4 is graph 2 for comparison among component indexes.

As can be seen from the above results, a significant increase in absorption of minerals, particularly Zn, Mn and Fe was confirmed, while no particular increase in absorption of Se itself was recognized, thus revealing the feature of the present invention brought about by the interaction of Se to promote absorption of other minerals. In the graph, the control group, the test group (applied to roots) and the test group (applied to leaves) are shown in this order from the left. Accordingly, the test group (applied to leaves) is shown in the black bar.

EXAMPLE 3

(1) Leeks during cultivation in a field had downy mildew (Feb. 2, 2000), and their leaves were broken with the top withered to lose commodity values, and the possibility of harvest disappeared. Accordingly, a 700-fold dilute solution of the agri- and horticultural material in Example 1 was sprayed onto leaves (Feb. 2, Mar. 20 and Apr. 8, 2000), and as a result, it was confirmed that the leeks recovered completely from downy mildew.

(2) In a tomato field where tomato plants (variety: Hana Queen) during cultivation in a house had a viral disease, so the Prefectural Agricultural Experimental Station directed us to root up the tomato plants in order to prevent infection of other areas, rooting up was terminated, and Zn, Cu, Fe, Mn, Mo, B etc. scarcely present in the soil were supplied to the roots, and then a 2000-fold dilute solution of the present material was supplied to the roots, and a 1000-fold dilute solution of the present material was sprayed onto the leaves. By applying it 5 times at 3-day intervals, the plants recovered from the viral disease, and tomato could be harvested.

EXAMPLE 4

Decopon [phonetic trans.: a kind of citrus] was treated with the agri- and horticultural material in Example 1 to give the following good results.

Figure 5:
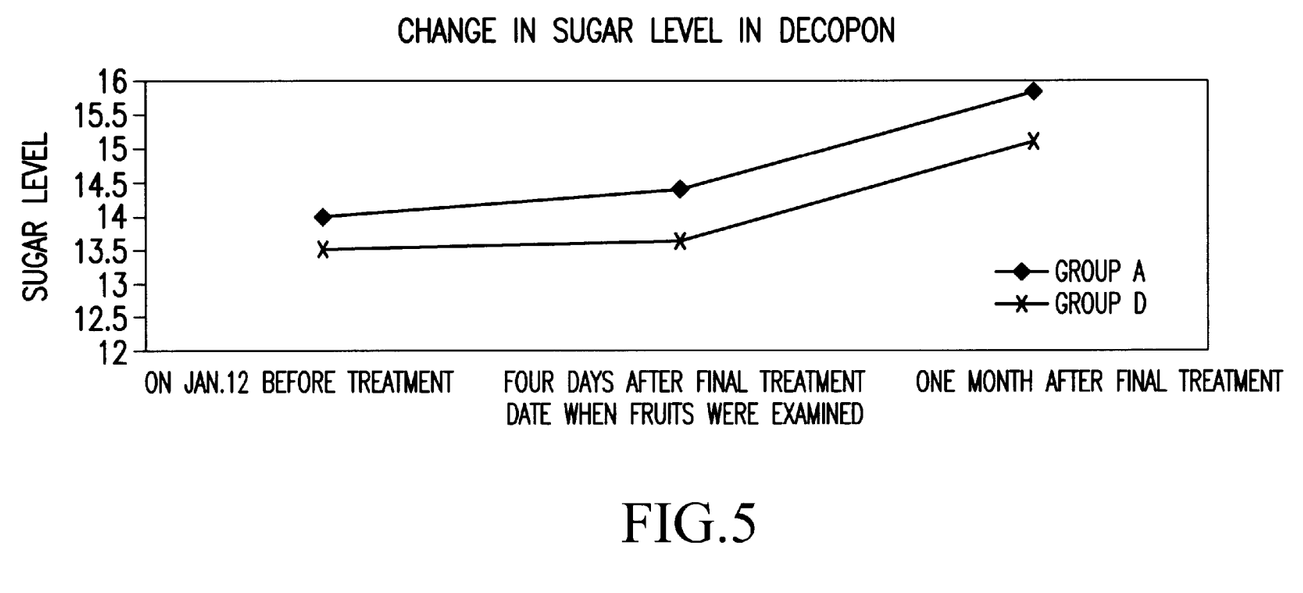
FIG. 5 shows a change in sugar levels in decopon [phonetic transcription] fruits.

(1) Decopon trees were cultivated in a vinyl house (Shiranui Town, Udo District, Kumamoto Pref., JP). The fruit trees were divided into group A as the test group and group D as the control group (untreated group) each group consisting of 4 fruit trees, and the present material was applied onto group A on Jan. 12, Jan. 17, Jan. 22 and Jan. 28, 2001, respectively, and the sugar levels of decopon fruits (stored on the trees) were analyzed on January 12 (fruits before treatment), February 1 (4 days after final treatment) and March 2 (1 month after final treatment). For group A (test group), a 2000-fold dilute solution of the present material was supplied to the soil close to the roots, while a 1000-fold dilute solution of the present material was sprayed onto the trees (over the ground). The results are shown in FIG. 5.

Figure 6:
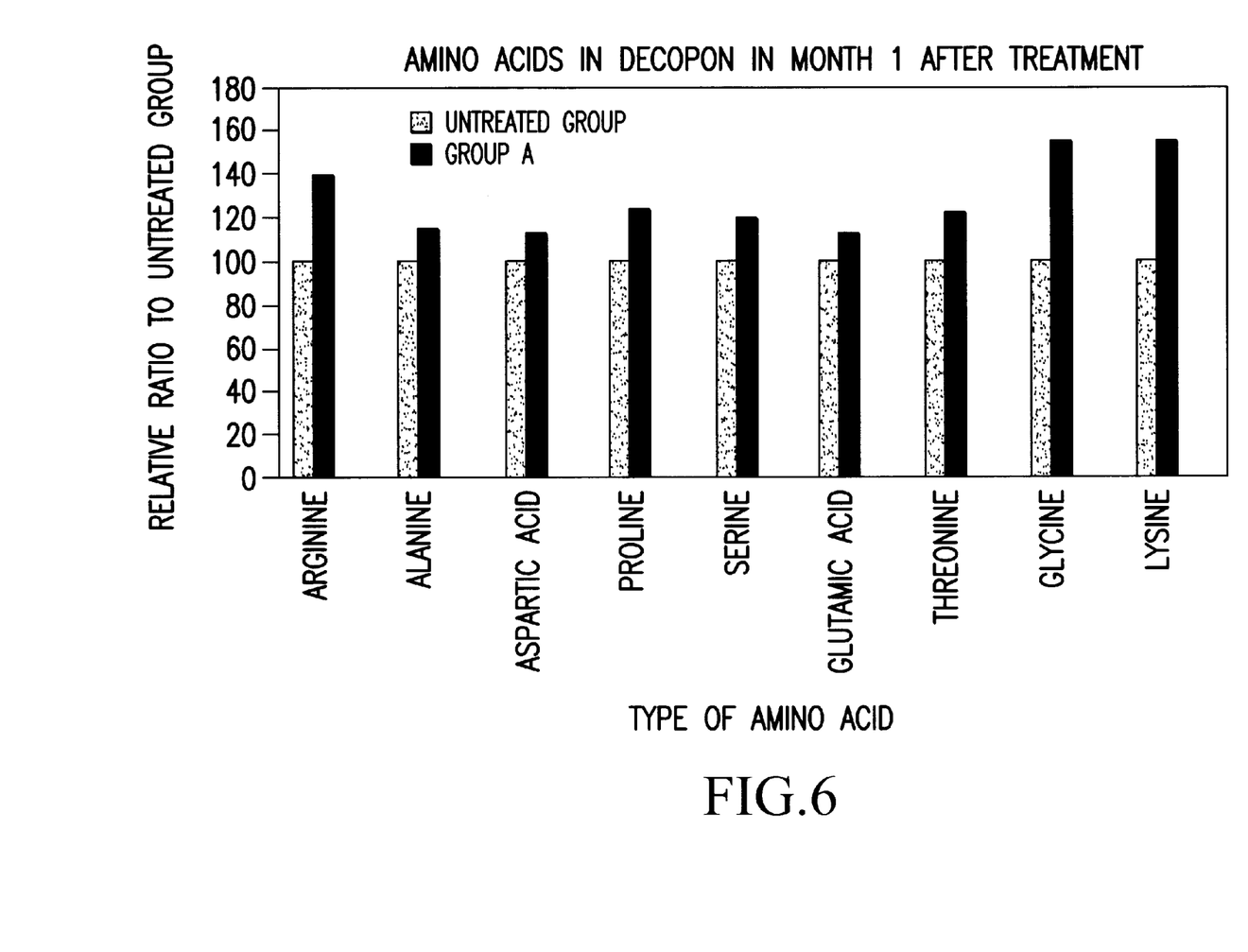
FIG. 6 shows the amino acid contents in decopon fruits.

(2) On January 19, decopon fruits from the test group (group A) and the control group (untreated group: group D) were examined respectively for their sugar levels, acidity and vitamin C levels, to give the results in Table 4 below. Further, the decopon fruits on Month 1 after treatment were measured for their amino acids to give the results in FIG. 6.

TABLE 4

| | | Control group | Test group |
|---|---|---|---|
| Sugar level | (Brix) | 13.7 | 14.1 |
| Acidity | (%) | 1.84 | 1.76 |
| Vitamin C | (mg/100 g) | 45.9 | 52.2 |

(3) As can be seen from these results, the sugar levels and vitamin C levels in the decopon fruits were increased while the acidity therein was reduced according to the present invention, so their sweetness felt extraordinarily relative to their sugar level. Further distinctively, all the amino acids measured were higher in the test group than in the control group (untreated group), and it was also confirmed in a panel test that the fruits were not only sweet but also deeply sweet with taste and good body.

(4) Further, it should be noted that these results are from data on Month 1 after treatment. That is, the sugar levels and amino acid content could be increased even after a predetermined period, and it was thus conformed that the present material can sufficiently improve qualities of crops such as decopon fruits to be shipped after being aged (or being left) for a predetermined period of time.

EXAMPLE 5

Figure 7:
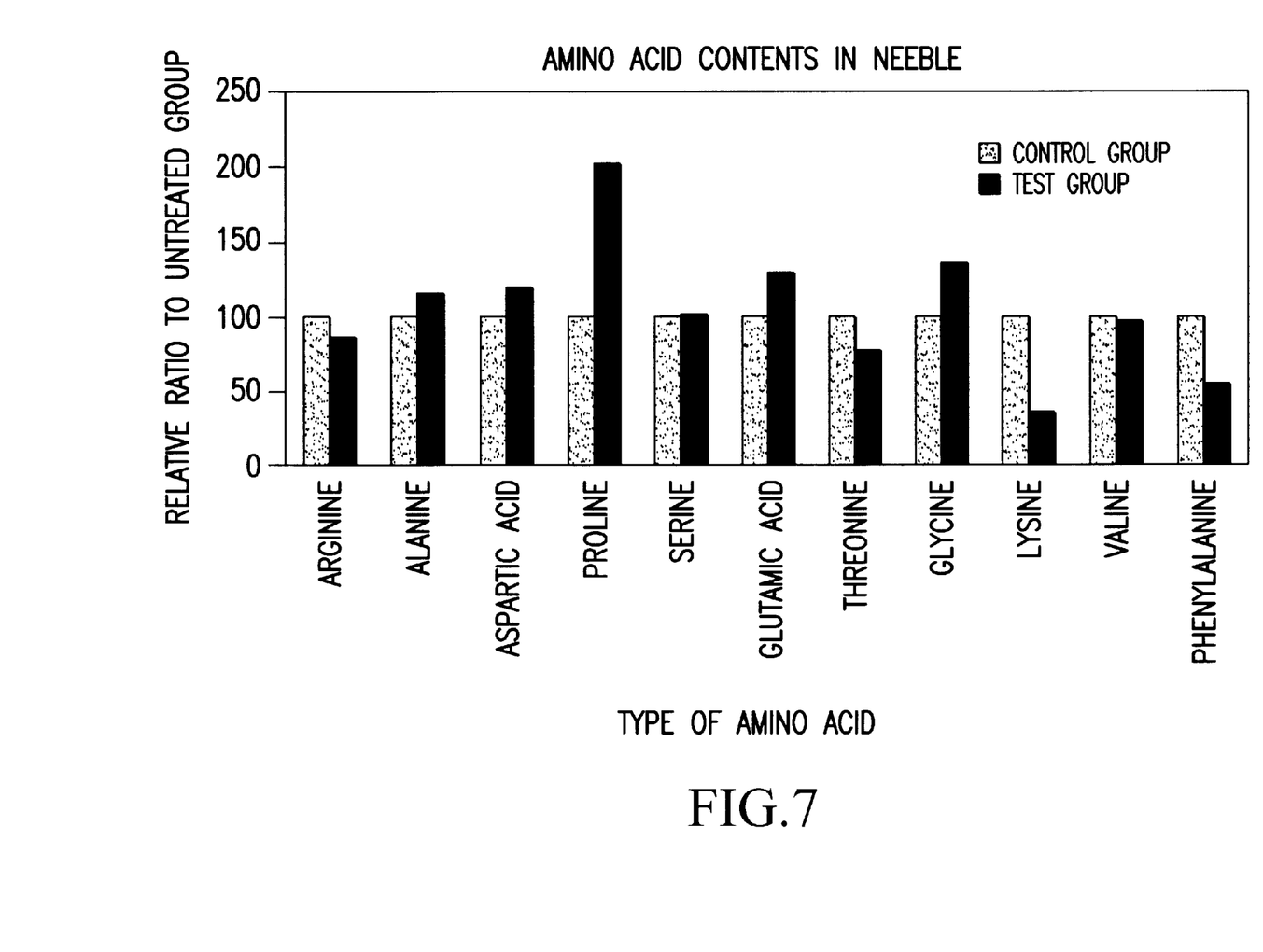
FIG. 7 shows the amino acid contents in neeble [phonetic transcription] orange fruits.

(1) Neeble [phonetic trans.] trees were cultivated in a vinyl house (Shiranui Town, Udo District, Kumamoto Pref., JP). The fruit trees were divided into a test group and a control group (untreated group) each group consisting of 4 fruit trees, and the present material was applied onto the test group in the same manner as in Example 4, and their fruits were harvested on Feb. 3, 2001, and immediately measured for their amino acid levels. The results are shown in FIG. 7.

As can be seen from the above results, a significant change in the amino acid composition was recognized upon application of the present material, and the content of alanine particularly proline for making strong sweetness was doubled, and when the neeble bruits were eaten, they felt not only sweet but also deeply sweet with good body or taste.

Figure 8:
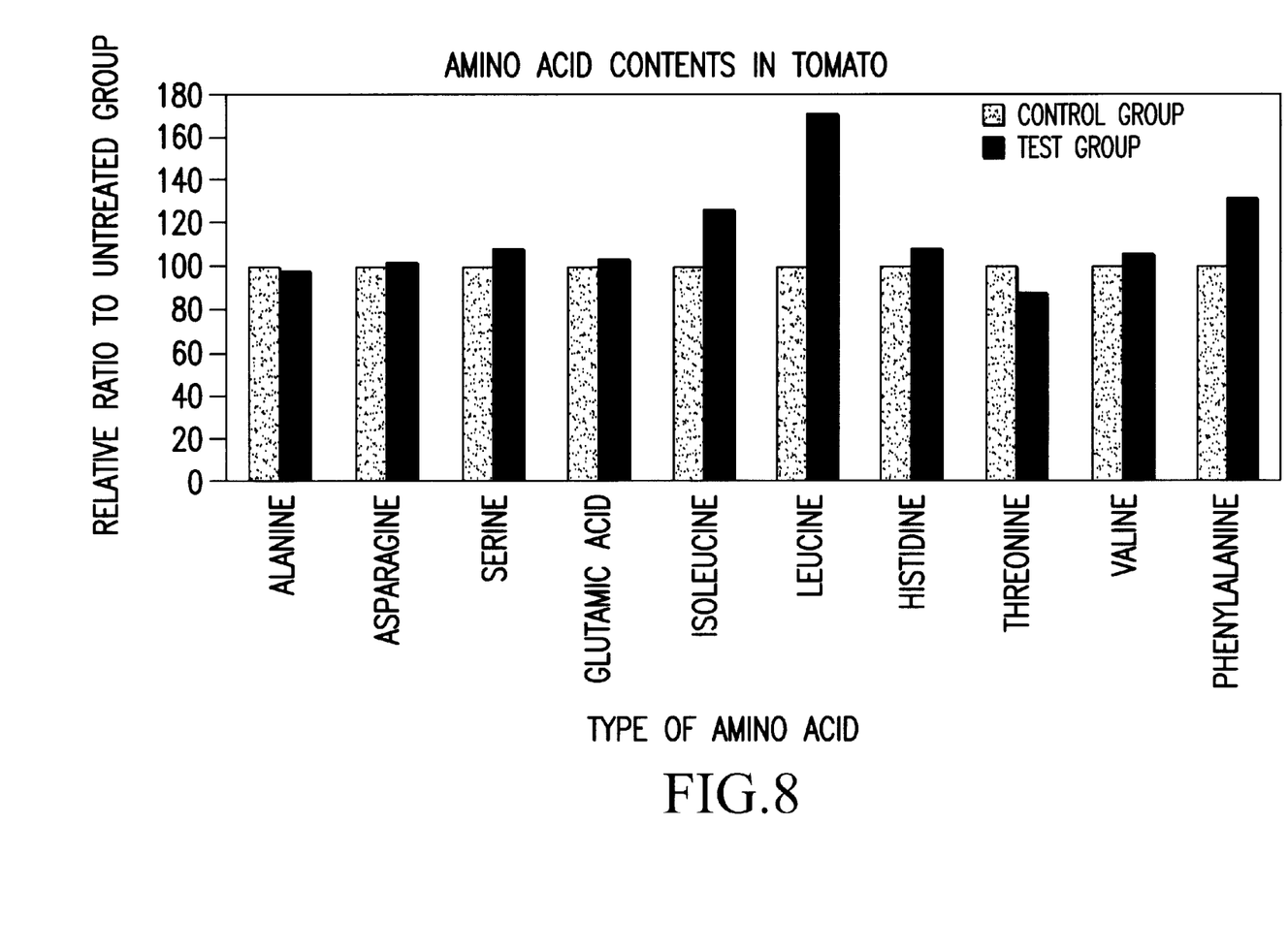
FIG. 8 shows the amino acid contents in tomato fruits.

(2) Tomato plants (variety: Hana Queen) were cultivated in a vinyl house (Tamana City, Kumamoto Pref., JP). In a filed of two ares, one are was used for the test group and the other for the control group (untreated group). The present material was applied onto the tomato plants on Apr. 1, Apr. 5, Apr. 10 and Apr. 15, 2001, respectively, and tomatoes were harvested on April 16 and immediately measured for their amino acid levels. The results are shown in FIG. 8. Because the growth conditions of these tomato plants were good, a 3000-fold dilute solution of the present material was supplied to the soil close to roots while a 2000-fold dilute solution of the present material was sprayed onto the plants over the ground.

As can be seen from the above results, the contents of almost all amino acids were increased by application of the present material, and in particular the content of phenylalanine was increased and the content of leucine making strong taste was doubled. When the resulting tomatoes were eaten, the tomatoes were confirmed to have good body rich in flavor.

EFFECT OF THE INVENTION

According to the present invention, the balance among minerals and other nutrients in crops and other plants is maintained and improved thereby making them healthy to confer higher resistance thereon. As a result, there are brought about useful working effects such as prevention and/or treatment of the damages caused by harmful insects or ticks or diseases, growth promotion, improvements in qualities, an increase in sugar levels, impartment of taste and good body without using agrichemicals or fertilizers (that is, without causing pollutions such as environmental pollution). Further, the present material can be used without any problem such as fruit-bearing in alternate years or failure in repeated cultivation on the same ground. Accordingly, the present material is a new material of completely different type from conventional materials, and the present agri- and horticultural material when expressed as a pharmaceutical preparation is not a direct preventive or therapeutic agent but an immune enhancer or an immune activator.

Further, the present invention is epoch-making because by using bittern, qualities of fruits, vegetables and other crops could be improved for the first time, and by using bittern, both enhancement of sweetness and impartment of taste and good body for crops could be realized for the first time, and further the relationship between amino acids in crops and impartment or improvement of taste and good body, that is, the relationship between the composition of amino acids or regulation of amino acid levels by use of bittern and impartment or improvement of taste and good body was confirmed for the first time, and in this respect, the present invention is very distinctive. According to the present invention, leaf crops, root crops and other non-fruit vegetables (vegetables with less or no sweetness) can be endowed with taste and good body.

What is claimed is:

1. An agri- and horticultural material comprising bittern as an active ingredient containing 1.0 to 5.0 ppm selenium.

2. The agri- and horticultural material according to claim 1, wherein the bittern contains 1.5 to 4.0 ppm selenium.

3. An agri- and horticultural material comprising bittern as an active ingredient containing 1.0 to 5.0 ppm selenium and 1.0 to 5.0 ppm vanadium.

4. The agri- and horticultural material according to claim 3, wherein the bittern contains 1.5 to 4.0 ppm selenium and 1.5 to 4.0 ppm vanadium.

5. A method selected from the group consisting of:
(1) controlling harmful insects and ticks;
(2) preventing or treating diseases;
(3) promoting plant growth;
(4) maintaining or improving mineral balance in soil;
(5) maintaining or improving mineral balance in crops; or
(6) improving quality of crops,
wherein said method comprises the step of:
applying the agri- and horticultural material according to claim 1 to at least one member selected from the group consisting of stems, leaves, buds, flowers, fruits, roots and soil.

6. The method according to claim 5, wherein the improving quality of crops (6) is by increasing the sugar level in crops.

7. The method according to claim 5, wherein the improving quality of crops (6) is by enhancing the taste of crops.

8. A method selected from the group consisting of:
(1) controlling harmful insects and ticks;
(2) preventing or treating diseases;
(3) promoting plant growth;
(4) maintaining or improving mineral balance in soil;
(5) maintaining or improving mineral balance in crops; or
(6) improving quality of crops,
wherein said method comprises the steps of:
preparing a 100- to 3000-fold dilution of the agri- and horticultural material according to claim 1; and
applying the dilution to at least one member selected from the group consisting of stems, leaves, buds, flowers, roots and soil.

9. The method according to claim 8, wherein the improving quality of crops (6) is by increasing the sugar level in crops.

10. The method according to claim 8, wherein the improving quality of crops (6) is by enhancing the taste of crops.

11. A method selected from the group consisting of:
(1) controlling harmful insects and ticks;
(2) preventing or treating diseases;
(3) promoting plant growth;
(4) maintaining or improving mineral balance in soil;
(5) maintaining or improving mineral balance in crops; or
(6) improving quality of crops,
wherein said method comprises the step of:
applying the agri- and horticultural material according to claim 3 to at least one member selected from the group consisting of stems, leaves, buds, flowers, fruits, roots, and soil.

12. The method according to claim 11, wherein the improving quality of crops (6) is by increasing the sugar level in crops.

13. The method according to claim 11, wherein the improving quality of crops (6) is by enhancing the taste of crops.

14. A method selected from the group consisting of:
(1) controlling harmful insects and ticks;
(2) preventing or treating diseases;
(3) promoting plant growth;
(4) maintaining or improving mineral balance in soil;
(5) maintaining or improving mineral balance in crops; or
(6) improving quality of crops,
wherein said method comprises the steps of:
preparing a 100- and 3000- fold dilution of the agri- and horticultural material according to claim 3; and
applying the dilution to at least one member selected from the group consisting of stems, leaves, buds, flowers, roots and soil.

15. The method according to claim 14, wherein the improving quality of crops (6) is by increasing the sugar level in crops.

16. The method according to claim 14, wherein the improving quality of crops (6) is by enhancing the taste of crops.

* * * * *